Patented July 11, 1950

2,514,389

UNITED STATES PATENT OFFICE 2,514,389

POLYMERIZABLE STYRENE-TALL OIL MODIFIED POLYESTER COMPOSITION

Sanford E. Glick, Springfield, Mass., assignor to Monsanto Chemical Company, St. Louis, Mo., a corporation of Delaware No Drawing. Application November 16, 1944, Serial No. 563,795

10 Claims. (Cl. 260—22)

This invention relates to a new polymerizable composition of matter and to materials impregnated therewith.

It is an object of this invention to provide a new polymerizable composition. Another object is to provide a polymerizable composition for impregnating porous materials. A particular object is to render porous metal castings impervious.

These and other objects are accomplished by the following invention which comprises incorporating styrene with a polyester comprising the residues of a glycol having from 2 to 6 carbon atoms, a dicarboxylic aliphatic acid having ethylenic unsaturation and not over 8 carbon atoms and tall oil, to form a polymerizable composition, particularly suitable for sealing porous materials such as magnesium and aluminum castings.

The following are examples illustrative of the present invention, but not limitative thereof. Where parts are given, they are parts by weight.

Example I

A mixture of 336 parts of diethylene glycol, 208 parts of maleic anhydride and 1 part of paratoluene sulphonic acid monohydrate is heated up to about 190° C. over a period of ½–1 hour and maintained at about 190° C. until the acid number (KOH equivalent in milligrams per gram of the reaction mixture) of the reaction mixture is reduced to about 5–15. This requires from ½–1½ hours. Thereafter, 456 parts of tall oil are added and the heating of the mixture continued at about 195–205° C. until the acid number of the reaction mixture is reduced to about 25–35. This requires about 2–3 hours. The foregoing reaction is carried out under an air condenser permitting escape of evolved water, while stirring and passing carbon dioxide gas through the reaction mixture. The product is a clear, resinous liquid having a viscosity of 55–65 poises at 25° C. (Gardner-Holdt viscosimeter).

Example II

A mixture of 180 parts of ethylene glycol, 305 parts of soybean oil and 0.3 part of litharge is heated at 190–195° C. until one volume of the reaction mixture is soluble in six volumes of methanol. 204 parts of maleic anhydride are then added and the mixture heated at 195° C. until the acid number of the reaction mixture is reduced to about 20. 305 parts of tall oil are then added and the heating continued until the product possesses an acid number of about 30 or less. The reaction is carried out under an air condenser permitting escape of evolved water, while stirring and passing carbon dioxide gas through the reaction mixture. The product is a clear resinous liquid having a viscosity of about 150–200 poises at 25° C. (Gardner-Holdt viscosimeter).

Example III

Example II is repeated except that the following ingredients are reacted in place of the ingredients used in Example II.

| Ingredients | Parts |
| --- | --- |
| Ethylene glycol | 169 |
| Diethylene glycol | 27 |
| Soybean oil | 301 |
| Litharge | 0.3 |
| Maleic anhydride | 202 |
| Tall oil | 301 |

The product possesses similar characteristics to the product described in Example II but combinations with styrene have improved penetrating characteristics in metals having fine porosity such as porous magnesium castings and the acid number of the polyester tends to be lower without an increase in viscosity. Thus, replacement of 5–10% of ethylene glycol by an equivalent amount of diethylene glycol is advantageous for such reasons without substantially reducing the especial advantages of polyesters made with ethylene glycol.

Mixtures of the foregoing polyester resins with styrene may be copolymerized to form infusible, insoluble products. The following examples illustrate the preparation of such polymerizable mixtures and their use in sealing porous materials.

Example IV

Porous magnesium castings are placed in a vessel capable of being evacuated and are then subjected to an absolute pressure corresponding to 3 inches of mercury or less for about one-half hour. Thereafter, while still maintaining the partial vacuum, a sufficient amount of a mixture of 65 parts styrene and 35 parts of the resin described in Example I is drawn into cover the castings and then a pressure of 50–90 pounds per square inch (gauge) is applied for about one-half hour. The castings are removed from the pressure vessel and after removal of excess of the impregnating composition by draining and then washing with a solvent for the impregnating composition, such as kerosene, toluene or the like, baked at 135° C. for about 2 hours under 75–95 pounds per square inch pressure followed by two hours at 150–175° C. in a circulating air oven. When desired, the impregnating composition may be completely polymerized under pressure by extending the heating period in that operation. The impregnated castings are found to possess the outstanding properties characteristic of the products of this invention.

*Example V*

Example IV is repeated except that a mixture of 40 parts of the resin described in Example I and 60 parts of styrene is used as the impregnant and porous aluminum castings are substituted for magnesium castings.

*Example VI*

Example IV is repeated except that a mixture of 55 parts of the resin described in Example I and 45 parts of styrene is used as the impregnant and porous iron castings are substituted for magnesium castings.

The polyester resins described in Examples II and III may be substituted for the polyester resins used in Examples IV to VI to produce products having unexpected and valuable characteristics.

The impregnating compositions of this invention are found to possess an unexpectedly high sealing efficiency, particularly when applied to magnesium castings which usually present an unusually difficult sealing problem due to the extreme fineness of the porosity. For example, the sealed castings of this invention, as illustrated by the examples, resist the action of 100 octane gasoline, lubricating oil, ethylene glycol, liquid trichloroethylene, mineral spirits and the like. A particular advantage of the products of this invention resides in their greatly reduced tendency to exude in contrast to similar products in which the polyester resin does not contain tall oil.

Numerous variations may be introduced into the present invention as illustrated by the above examples. Thus, the reaction temperatures at which the resins described in Examples I to III are prepared may be substantially varied. In place of carbon dioxide gas, other inert gases such as nitrogen may be passed through the reacting mixture. In place of toluene sulfonic acid in Example I, other catalysts may be used such as other sulfonic acids, e. g. benzene sulfonic acid, sulfuric acid, metallic oxides such as litharge, calcium oxide and the like. In place of litharge in Example II, other metal oxides such as calcium oxide may be used. Under certain conditions the passage of inert gas and the inclusion of catalyst may be omitted, although it is preferred that the reaction conditions, e. g. temperature, pressure, nature and amount of catalyst, etc. be so correlated that a fusible product may be obtained which has an acid number below 50 and, more particularly, between 5 and 35, and a viscosity of 10–200 poises at 25° C. (Gardner-Holdt viscosimeter).

In place of maleic anhydride, dicarboxylic aliphatic acids generally, which have ethylenic unsaturation, and not over 8 carbon atoms, or the anhydrides thereof may be used. As examples of such acids may be mentioned maleic acid, fumaric acid, citraconic acid, mesaconic acid, methylethyl maleic acid, diethyl maleic acid, chlormethyl maleic acid and the like. A particularly preferred group of acids or anhydrides comprise the compounds having the general formula

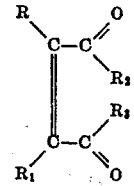

wherein R and $R_1$ are hydrogen, halogen or alkyl groups having not over two carbon atoms and $R_2$ and $R_3$ are OH or $R_2$ and $R_3$ together stand for oxygen. When desired mixtures of two, three or more of the above dicarboxylic acids may be used. When desired, up to about 20% of the unsaturated acid may be replaced by an equivalent amount of a saturated dicarboxylic acid having from 4 to 8 carbon atoms such as succinic acid, adipic acid and phthalic acid, phthalic acid being especially preferred.

As examples of glycols having 2–6 carbon atoms, may be mentioned ethylene glycol, diethylene glycol, propylene glycols, such as 1,2- and 1,3-propanediol, butylene glycols, such as 1,2-butanediol, 1,3-butanediol and 1,4-butanediol, triethylene glycol and the like. When desired, mixtures of two, three, or more glycols may be used. Especially preferred are ethylene glycol and diethylene glycol which may be represented by the formula $CH_2OH-(CH_2-O-CH_2)_n-CH_2OH$, wherein $n$ is 0 or 1.

In general, the amount of glycol employed is such that the hydroxyl groups present in the glycol substantially balance the carboxyl groups in the acid components. However, a small excess of glycol, e. g. a 5–10% excess facilitates the preparation of a product having a low acid number without adversely affecting the characteristics of the product.

In place of soybean oil used in Examples II and III other vegetable oils substantially free from conjugated unsaturation may be used in preparing the polyester component, as for example, linseed, castor, perilla, corn, cottonseed, sunflower, safflower, sesame, poppyseed, dehydrated castor oils, palm kernel, cocoanut and the like and mixtures thereof.

In place of the vegetable oils, long chain monocarboxylic aliphatic acids free from conjugated unsaturation, i. e. acids having from 10–20 carbon atoms may be used. As examples of such acids which may be used in the form of free acids or the glycerides thereof may be mentioned, saturated aliphatic acids such as decanoic acid, undecanoic acid, dodecanoic acid, tridecanoic acid, tetradecanoic acid, pentadecanoic acid, hexadecanoic acid, heptadecanoic acid, octadecanoic acid and nonadecanoic acid. These acids may have straight or branched chains or substituted chains, for example, substituted with halogen or hydroxyl groups, as for example, monochlor-octadecanoic acid, 12-hydroxy octadecanoic acid, and the like; unsaturated aliphatic acids, for example, monoolefinic-unsaturated aliphatic acids such as 7-hexadecenoic acid, 10-undecenoic acid, 9-octadecenoic acid; diolefinic-unsaturated aliphatic acids such as, 9,12-octadecadienoic acid; triolefinic unsaturated aliphatic acids, such as 9,12,15-octadecatrienoic acid; substituted olefinic acids, for example, such hydroxy acids as 16-hydroxy-7-hexadecenoic acid and 12-hydroxy-9-octadecenoic acid; halogenated acids, such as, for example, monochlor-9-octadecenoic acid, monochlor-12-hydroxy-9-octadecenoic acid and acids derived by dehydration of castor oil acids followed by chlorination.

The tall oil used in the examples is a product sold under the trade name "Ligro" and is made up of 45-50% fatty acids, 42-48% rosin acids calculated as abietic acid, and 6-9% sterols, higher alcohols, etc. Other tall oils may be used, such as "Indusoil" which is made up of 55-60% fatty acids, 34-38% rosin acids calculated as abietic acid and 6-10% sterols, higher alcohols, etc. The sterols and other components present in tall oil in addition to rosin acids and fatty acids, contribute substantially to the advantageous effects of tall oil in the compositions of this invention.

In general, the polymerizable composition comprises 20-80 parts of the polyhydric alcohol-polycarboxylic acid resin for every 80-20 parts of styrene and preferably from 30-70 parts of the polyester for every 70-30 parts of the styrene. However, since the coarseness of the porosity of various castings varies substantially, it is desirable to work within narrower ranges when treating any particular type of porosity. In the table are shown the preferred range of proportions for the types of porosity usually found in iron, aluminum and magnesium castings.

*Table*

| Type of casting | Proportions of components | |
|---|---|---|
| | Polyester resin | Styrene |
| | Parts | Parts |
| Iron | 50-65 | 50-35 |
| Aluminum | 35-45 | 65-55 |
| Magnesium | 30-40 | 70-60 |

When the sealant mixture is to be stored for substantial periods of time prior to use it is desirable to include an inhibitor, for example, 0.25 part-1.0 part of guaiacol for every 100 parts of the mixture. Other inhibitors may be used, such as para-quinone, para-tertiary butyl catechol, hydroquinone, ortho-dinitrophenols, ortho-trinitrophenols and the like. A surprising characteristic of the polymerizable compositions of the invention is the inhibitory effect of oxygen on the polymerization. Thus, when stored in containers open to the air or in containers in which air or oxygen is continuously or periodically supplied or in containers having a large proportion of air or oxygen, the compositions remain substantially unpolymerized for long periods of time, e. g. several weeks or months whereas when stored in closed containers having a low proportion of free air space or covered with an inert gas such as nitrogen or carbon dioxide, the compositions polymerize to a solid gel in a short time, e. g. in a few days, even at room temperatures. This characteristic is valuable in that the compositions or porous metal castings impregnated therewith may be cured while exposed to air or oxygen without forming a skim coating of polymer, i. e., the compositions progressively cure from the inside out. The foregoing effect is especially noticeable in compositions containing inhibitors such as those given above.

Due to the rapid rate of polymerization of the polymerizable compositions of this invention, it is generally not necessary to include polymerization catalysts. However, when advantageous, polymerization catalysts may be used, as, for example, such peroxide catalysts as acetyl peroxide, benzoyl peroxide, lauroyl peroxide and the like. A preferred group of peroxide catalysts comprises long chain aliphatic peroxides, e. g. peroxides having an aliphatic chain of 10-20 carbon atoms, such as lauroyl peroxide, stearoyl peroxide and the like, particulary when the metal casting is of a type readily corroded such as magnesium.

In the production of a sealant for porous metal castings, the tall oil content of the polyester is in the range 25-60% and, preferably, the tall oil content is between 30 and 50%. The amount of long chain acids free from conjugated unsaturation added in addition to those present in the tall oil may be substantially varied but preferably the sum of the tall oil content and other long chain acids does not exceed 70% of the polyester. A particularly preferred class of polyesters containing additional long chain acids, contain a total of 50-70% tall oil and other long chain acid residues, from 50-75% of these acid residues being tall oil.

In testing the rate of polymerization of sealants, 5-6 cc. of the sealant are placed in a test tube (150 mm. long and 16 mm. in diameter), together with a glass stirring rod. The test tube and contents are heated at 250° F., e. g. in an oil bath, and the rod lifted at 15-second intervals until the gel is hard enough for the test tube to be suspended by the stirring rod. Sealants made according to this invention require less than 30 minutes at 250° F. to reach this point, 15-30 minutes usually being required even in the absence of catalysts. This characteristic is a further contribution to the outstanding value of the products of this invention.

Advantageously, neutral unsaturated aliphatic hydrocarbons having a molecular weight in the range 150-700 and averaging about two double bonds per molecule may be included in the polymerizable compositions of this invention. Thus, the unsaturated hydrocarbons marketed by Advance Solvents and Chemical Corporation, 345 Fifth Avenue, New York, N. Y., under the trade name "Orolin" may be used. In general, 10-30 parts of the neutral unsaturated aliphatic hydrocarbons may be incorporated with 90-70 parts of the polyester illustrated by Examples I-III. Compositions comprising 30-40 parts of such mixtures and 70-60 parts of styrene are especially advantageous as impregnating compositions for porous magnesium castings. For example, 20 parts of "Orolin #1" may be incorporated with 80 parts of the polyesters as illustrated by Examples I-III and 35 parts of such mixtures incorporated with 65 parts of styrene. The addition of these unsaturated hydrocarbons is particularly valuable in compositions which have a tendency to exude from castings during polymerization and decrease the period required for polymerization under pressure. The mixtures of "Orolin" and polyester may, in general, be incorporated with styrene in the proportions given hereinbefore for polyester-styrene mixtures.

Other methods of impregnating porous castings with the compositions of this invention may be used. Thus, the castings may be immersed in the sealing composition to form a continuous coating and baked after removal. Another method in the case of hollow castings comprises forcing the sealant into the casting from within the casting and after removal of excess sealant heating the casting to polymerize the sealant. Another method comprises suspending the castings in a body of the sealant under pressure, for example, 10–90 pounds per square inch, followed by removal of excess impregnant and baking.

In carrying out the baking operation, it is preferred that the sealant be at least initially polymerized under pressure to avoid loss of material by exudation and/or volatilization. The baking conditions given in the above examples may be substantially varied. However, a temperature in the range 100–200° C. is generally preferred. The heating time required to reach the desired degree of polymerization depends on the baking temperature selected and to some extent on the particular formulation used.

An important use of the sealed castings of this invention comprises their use in contact with hydraulic systems whereby loss of fluid contained therein is avoided. Examples of airplane parts requiring effective sealing are supercharger housings, hydraulic system parts, nose sections, gasoline injection system parts and the like.

Other applications for the polymerizable compositions of this invention include polymerization in mass to form flexible, infusible, insoluble castings, coating and/or impregnating various materials such as textiles, paper, wood, metals and the like, followed by polymerization in situ, admixture with fillers such as wood flour, cellulosic fibers, mica, rag stock, quartz, chlorinated diphenyls, etc. followed by molding under heat and pressure to form valuable molded products.

It is to be understood that the description of this invention is illusrative thereof and that variations may be made within the scope of the invention as defined in the appended claims.

What is claimed is:

1. A polymerizable composition consisting essentially of 30 to 70 parts of styrene and 70 to 30 parts of a polyester which is a mixed ester taken from the group consisting of (1) the reaction product of a glycol having more than one but less than seven carbon atoms, tall oil, and a dicarboxylic acid having ethylenic unsaturation and not more than eight carbon atoms, said polyester having a tall oil residue content of 25% to 60% by weight and (2) the reaction product of a glycol having more than one but less than seven carbon atoms, tall oil, a dicarboxylic acid having ethylenic unsaturation and not more than eight carbon atoms and a vegetable oil substantially free from conjugated unsaturation, said reaction product (2) having a monocarboxylic acid residue content of 50% to 70%, and 50% to 75% of said monocarboxylic acid residue being derived from tall oil, the acid number of said polyesters being less than 50 and the glycol being used in said polyesters in an amount sufficient for the hydroxyl groups of the glycol to substantially balance the carboxyl groups in the acid components of the polyester.

2. A polymerizable composition consisting essentially of 30 to 70 parts of styrene and 70 to 30 parts of a polyester which is the reaction product of a glycol having more than one but less than seven carbon atoms, tall oil, and a dicarboxylic acid having ethylenic unsaturation and not more than eight carbon atoms, said polyester having a tall oil residue content of 25% to 60% by weight and an acid number of less than 50, the glycol being used in an amount sufficient for the hydroxyl groups of the glycol to substantially balance the carboxyl groups in the acid components of the polyester.

3. A product as defined in claim 2 in which the dicarboxylic acid is maleic acid.

4. A polymerizable composition consisting essentially of 30 to 70 parts of styrene and 70 to 30 parts of a polyester which is the reaction product of a glycol having more than one but less than seven carbon atoms, tall oil, a dicarboxylic acid having ethylenic unsaturation and not more than eight carbon atoms and a vegetable oil substantially free from conjugated unsaturation, the said reaction product having a monocarboxylic acid residue content of 50% to 70% of which content 50% to 75% is derived from tall oil, said polyester having an acid number of less than 50 and the glycol being used in an amount sufficient for the hydroxyl groups of the glycol to substantially balance the carboxyl groups in the acid components of the polyester.

5. A composition as defined in claim 4 in which the vegetable oil is soy bean oil.

6. Porous metal castings the pores of which are filled with an infusible insoluble product resulting from the polymerization in situ of the polymerizable composition of claim 1.

7. A porous magnesium casting the pores of which are filled with an infusible insoluble product resulting from the polymerization in situ of the polymerizable composition of claim 1.

8. A porous aluminum casting the pores of which are filled with an infusible insoluble product resulting from the polymerization in situ of the polymerizable composition of claim 1.

9. A porous iron casting the pores of which are filled with an infusible insoluble product resulting from the polymerization in situ of the polymerizable composition of claim 1.

10. Porous metal castings the pores of which are filled with an infusible insoluble product resulting from the polymerization in situ of the polymerizable composition of claim 4.

SANFORD E. GLICK.

REFERENCES CITED

The following references are of record in the file of this patent:

UNITED STATES PATENTS

| Number | Name | Date |
| --- | --- | --- |
| 1,187,746 | Kirchenbauer | June 20, 1916 |
| 2,039,243 | Krzikalla | Apr. 28, 1936 |
| 2,174,887 | Kiefer | Oct. 3, 1939 |
| 2,195,362 | Ellis | Mar. 26, 1940 |
| 2,255,313 | Ellis | Sept. 9, 1941 |
| 2,308,495 | D'Alelio | Jan. 19, 1943 |
| 2,407,479 | D'Alelio | Sept. 10, 1946 |

FOREIGN PATENTS

| Number | Country | Date |
| --- | --- | --- |
| 316,914 | Great Britain | Aug. 6, 1929 |
| 506,796 | Great Britain | 1938 |